Mar. 13, 1923. 1,448,518.
C. F. BROWN.
MACHINE FOR SHARPENING LAWN MOWERS.
FILED MAR. 18, 1921. 4 SHEETS—SHEET 1.
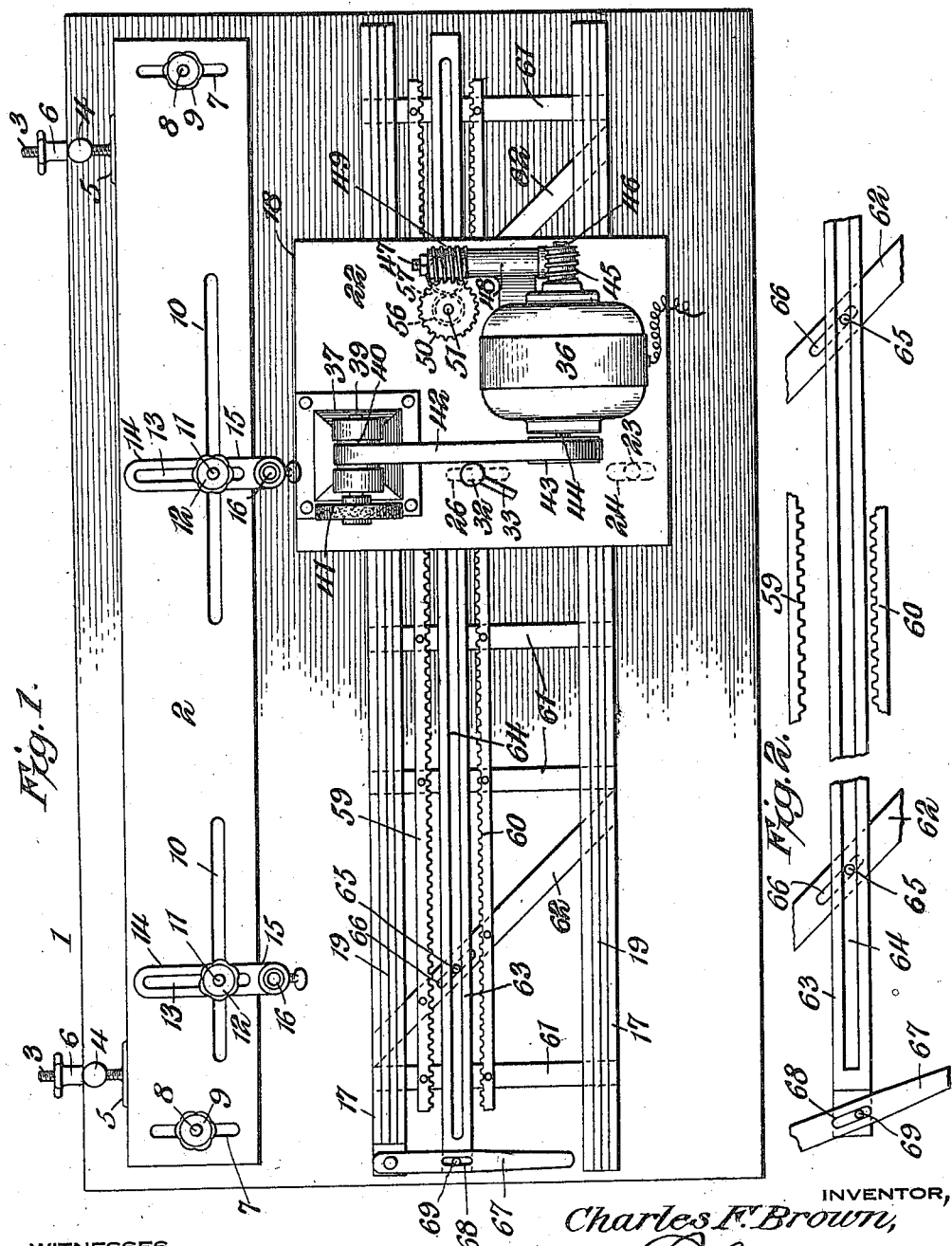
WITNESSES
Howard F. Orr.
F. T. Chapman.
INVENTOR,
Charles F. Brown,
BY
C. G. Siggers.
ATTORNEY

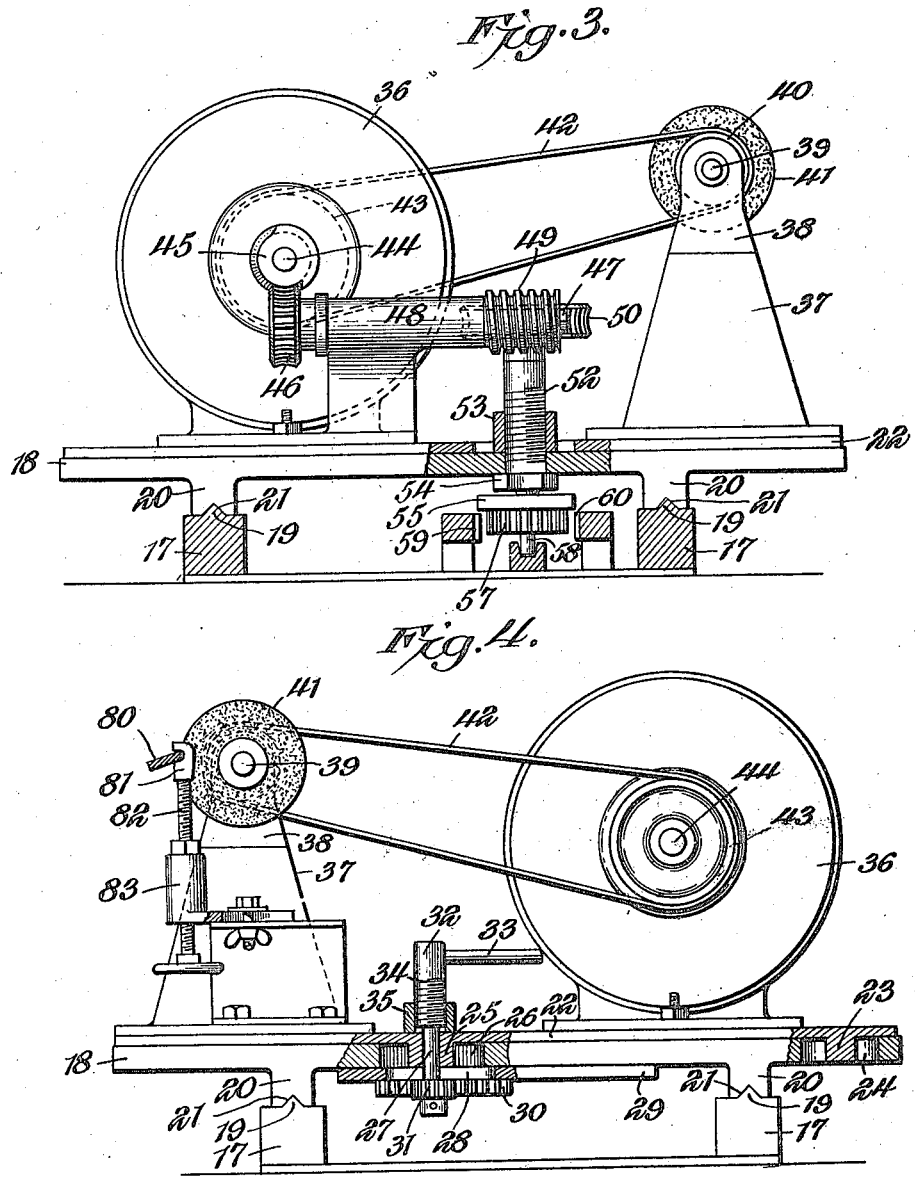

Mar. 13, 1923.
C. F. BROWN.
MACHINE FOR SHARPENING LAWN MOWERS.
FILED MAR. 18, 1921.
1,448,518.
4 SHEETS—SHEET 3.
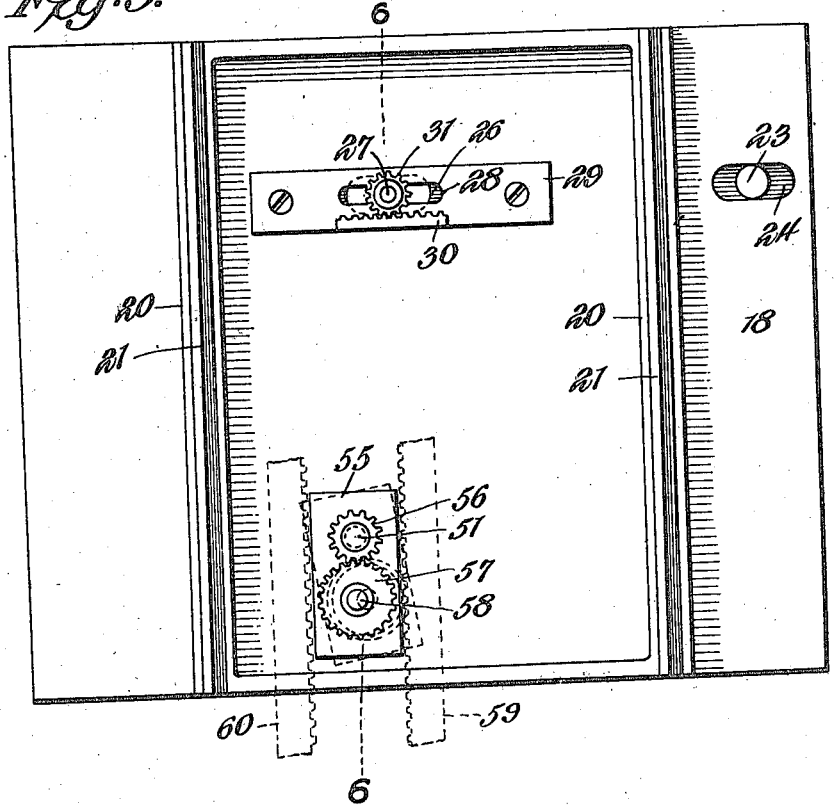
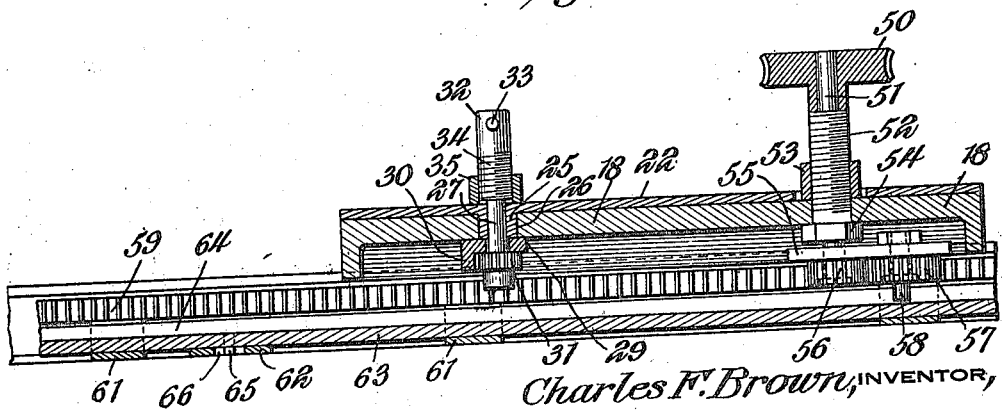
Charles F. Brown, INVENTOR,
WITNESSES
Howard D. Orr.
F. T. Chapman.
BY
ATTORNEY

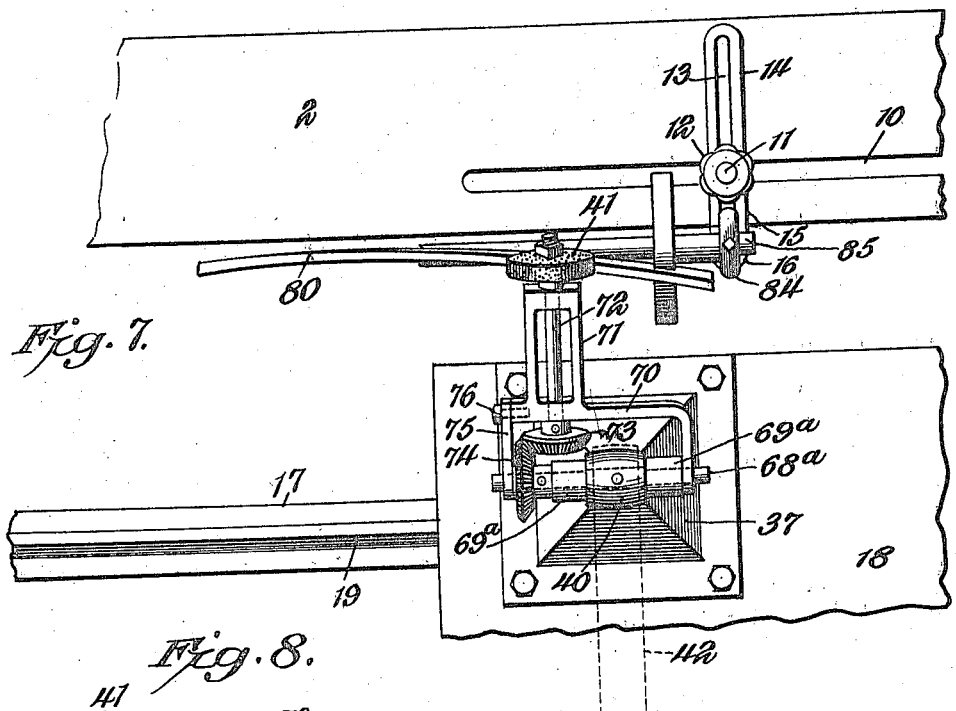
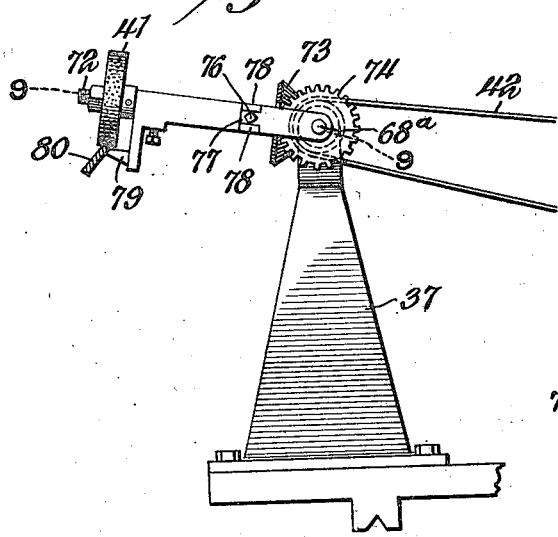
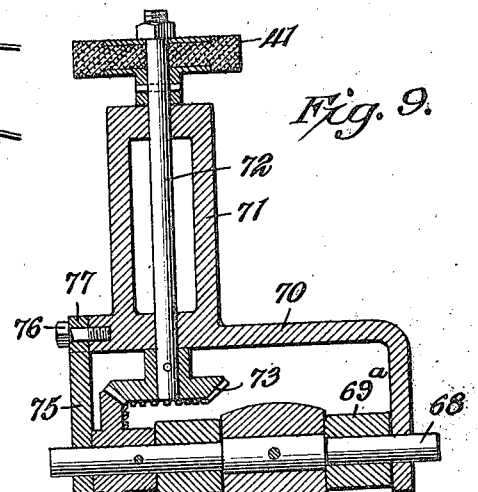
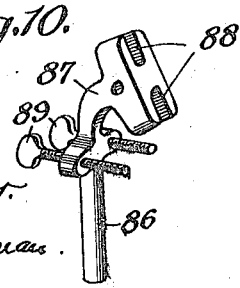

Patented Mar. 13, 1923.

1,448,518

UNITED STATES PATENT OFFICE.

CHARLES FRANCISCO BROWN, OF GREENEVILLE, TENNESSEE.

MACHINE FOR SHARPENING LAWN MOWERS.

Application filed March 18, 1921. Serial No. 453,333.

*To all whom it may concern:*

Be it known that I, CHARLES F. BROWN, a citizen of the United States, residing at Greeneville, in the county of Greene and State of Tennessee, have invented a new and useful Machine for Sharpening Lawn Mowers, of which the following is a specification.

This invention has reference to machines for sharpening lawn mower blades, and its object is to provide for the sharpening of the blades either when on or removed from the body of the machine and to provide for the feeding of the sharpening wheel or grinder lengthwise of the blades from end to end and the return of the sharpening device to the initial position.

The invention is an improvement upon the machine for sharpening lawn mower blades shown and described in United States Letters Patent No. 1,344,168, granted to me on June 22nd, 1920.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:

Fig. 1 is a plan view of a lawn mower sharpener embodying the invention in part.

Fig. 2 is a view on a larger scale than Fig. 1 of a portion of the carriage feed mechanism.

Fig. 3 is an elevation, with some parts in section, drawn on a larger scale than Fig. 1 and viewed from the righthand end of Fig. 1.

Fig. 4 is an elevation, with some parts in section, of the mechanism of Fig. 3 but viewed from the opposite side thereof.

Fig. 5 is a bottom plan view of the carriage.

Fig. 6 is an upright section of the carriage on the line 6—6 of Fig. 5 and showing some parts underlying the carriage and some parts above and mounted on the carriage.

Fig. 7 is a plan view of a portion of a sharpening machine adapted for receiving the whole lawn mower excepting the handle.

Fig. 8 is a side elevation of the portion of the sharpening machine mounted on the carriage.

Fig. 9 is a section on the line 9—9 of Fig. 8.

Fig. 10 is a detail perspective view of a fixed blade holder.

Referring to the drawings wherein a preferred embodiment of the invention is illustrated, there is shown a table or support 1, which may be of any suitable shape and construction considerably elongated so as to accommodate various lengths of lawn mowers to be sharpened. Along one long edge of the table 1, there is mounted a work support 2 similar to the work support shown in the aforesaid Letters Patent and of appropriate height above the surface of the table.

At the opposite ends of the work support, adjusting screws 3 are threaded through posts 4 and made fast, as by plates 5, to the work support, the screws 3 each having a hand nut 6 permitting a fine adjustment of the support 2 laterally of the table 1. At each end of the support 2 there is a lateral slot 7 through which projects a clamp screw 8 provided with a hand nut 9, so that when the desired adjustment of the table 2 is accomplished, the nuts 9 may firmly clamp the table in position.

The work support 2 is provided with longitudinal slots 10 parallel with one long edge of the support and sufficiently elongated to provide for a considerable extent of adjustment. Each slot 10 is traversed by a clamp bolt 11 to which is applied a clamp nut 12. The bolt 11 traverses an elongated slot 13 in the foot or base 14 of a bracket 15 carrying at one end a socket member 16, designed to receive a carrier or work holder to secure the blade assembly of the lawn mower. No attempt is made to show the carriers received by the sockets 16 as these parts are the same as shown in the aforesaid Letters Patent, and in themselves constitute no part of the invention revealed in this application.

The work support 2 constitutes a means whereby the lawn mower blade assembly and also the straight cutter bar may be carried and adjusted in various ways for grinding purposes. On the table 1 in parallel spaced relation to each other and to the work support 2 are elongated tracks 17, designed to support a carriage 18 of appropriate size and of rectangular contour, although such particular shape is not obligatory. The tracks 17 differ from the tracks shown in the aforesaid Letters Patent in that they are provided with triangular treads 19 (instead of V-shaped grooves) connected by cross members 61.

The carriage 18 (see Figs. 3 and 4) is provided with runners or slides 20 having V-shaped grooves 21 fitting and receiving the treads 19 so that the runners 20 become self clearing as the carriage is moved along the tracks. Mounted on the upper surface of the carriage 18 is a plate 22 capable of limited adjustment thereon. The plate 22 is guided on the carriage 18 by a pin or projection 23 entering a slot or concavity 24 in the surface of the carriage 18. The plate 22 is further guided by another pin 25 extending through and movable in a slot or concavity 26 in the carriage 18. The pin 25 is traversed by an arbor 27 for which the pin 25 constitutes a journal bearing and the arbor 27 is sufficiently long to pass through a slot 28 in an elongated plate 29 fast on the under side of the carriage 18. Secured to the plate 29 at one side of the slot 28 is a rack bar 30 (Figs. 4 and 5) and meshing with the rack bar 30 is a pinion 31 fast to the arbor 27. On turning the arbor 27, the pinion 31 is caused to travel along the rack bar 30 and so adjust the plate 22 over the carriage 18 independent of participation of the plate 22 in movements of the carriage 18.

At the end of the arbor 27, rising above the plate 22, an elongated head 32 is secured, said head carrying a manipulating handle 33. For a portion of its length the head 32 has exterior screw-threads 34 and there is provided a jamb nut 35 engaging with threads 34 and arranged to engage the upper surface of the plate 22, thus locking the spindle 27 against rotation when the nut 35 is screwed tight. The spindle 27 with the rack and pinion controlled thereby provides a convenient means for adjusting the plate 22 laterally of the direction of travel of the carriage 18 along the tracks 17.

Mounted on the plate 22 is an electric motor 36 of any suitable type and capacity and also mounted on the plate 22 is a pedestal 37 carrying at its upper end a bearing 38 in which is mounted a spindle 39 carrying a pulley 40 and also adapted to support a grinding wheel 41 of emery or other appropriate abrasive material constituting the sharpening element of the machine. The pulley 40 is engaged and driven by a belt 42 passing over a pulley 43 on the armature shaft 44 of the electric motor 36. At the end of the armature shaft 44 remote from the pulley 40 is a worm 45 in mesh with the worm gear 46 of a shaft 47 journalled in a bracket 48, which may be cast or fast on the base of the motor 36. The shaft 47 also carries at the end remote from the worm gear 46 another worm 49 meshing with a worm gear 50 on the upper end of an upright shaft 51 (Fig. 6) extending through a threaded sleeve 52 traversing the body of the carriage 18 and held in position thereon by a jamb nut 53 and by a lock nut 54. Extending down through the sleeve 52 the shaft 51 traverses a plate 55, near one end of the latter and carries a pinion 56 (Figs. 5 and 6) fast to the shaft and in mesh with a gear wheel 57 carried by and rotatable on a spindle 58 mounted on the plate 55 at the end thereof remote from the shaft 51. The plate 55 is capable of rocking about the shaft 51 as an axis as indicated in dotted lines in Fig. 5 and both the plate and the meshing gears 56 and 57 are located between two elongated parallel rack bars 59 and 60 fast on cross bars 61 and 62 in turn fast on the table 1.

The arrangement of the gears 56 and 57 and the plate 55 is such that the gear wheel 57 may be rocked into mesh with either one of the rack bars 59 or 60. To accomplish this, there is located between the rack bars 59 and 60 an elongated channel bar 63 (Figs. 2 and 6) provided with an elongated channel 64 into which the lower end of the spindle 58 extends as indicated in Figs. 3 and 6. The channel bar 63 is capable of being moved longitudinally and is provided with pins 65 entering slots 66 formed in the cross bars 62, of which there are two in the showing of Fig. 1 under-riding the channel bar 63, so that by moving the bar 63 longitudinally, it is propelled between the rack bars 59 and 60 in a diagonal path, so that the bar 63 approaches one or the other of the rack bars, as the case may be. To accomplish this, there is provided a lever 67 (see Fig. 1) having a slot 68 in which there engages a pin 69 fast on one end of the bar 63 said lever being pivoted to one end of one of the tracks 17.

In order to sharpen the cutter blades, a rotary blade assembly will be removed from the lawn mower its shaft is mounted on the brackets 15 and by a manipulation of the clamping means provided is adjusted into proper relation to the path of the grinding wheel 41 and the parts are then locked in the adjusted position, so that as the grinding wheel 41 is moved lengthwise of the cutter blades, a small amount of metal is removed from each blade.

After having properly adjusted the support 2 with the blade assembly thereon, the carriage 18 is then adjusted with respect to the cutter assembly. This may be accomplished by means of the shaft spindle 27 and the rack 30 and pinion 31 after loosening the clamp nut 35, whereby the plate 22 is moved with respect to the carriage 18, thus feeding the grinding wheel 41 toward the plate to be sharpened.

At the beginning of the operation the grinding wheel 41 is located adjacent to one end of the blade to be sharpened, and the motor drives the gear wheel 57 so that when engaging the appropriate rack bar, say the rack bar 59, the carriage 18 is moved toward the opposite end of the blade to be sharpened, until it has reached the limit of its travel. By shifting the lever 67, the bar 63 is shifted toward the rack bar 60. Such shifting of the parts causes the gear wheel 57 to feed the carriage in the reverse direction, and when the limit of travel in such reverse direction is completed, a re-shifting of the lever 67 will cause a corresponding reversal of the travel of the carriage, the grinding wheel again engaging an appropriate blade to be sharpened.

When it is desired to grind the blades without dismantling the lawn mower further than removing the handle and roller the construction of Figs. 7, 8, 9 and 10 is preferably employed. Supporting arms are mounted in brackets 15 and in turn are made fast to that part of the lawn mower frame from which the roller was removed. In place of the grinding mandrel 39, there is provided a shaft or spindle 68ª having journal bearings 69ª carried by the pedestal 37. The shaft 68ª also passes through the ends of a yoke 70 capable of rocking on the shaft 68 and near one end provided with a frame 71 at right angles to the length of the yoke 70. Mounted in the frame 71 is a countershaft 72, one end of which projects beyond the outer end of the frame 71 and there carries the grinding wheel 41. The end of the shaft 72 remote from the grinding wheel 41 carries a bevel pinion 73 adjacent to the shaft 68ª which latter carries a bevel pinion 74 meshing with the bevel pinion 73. That end of the yoke 70 adjacent to the pinion 74 is separately formed as indicated at 75, so that it may be removed at will, being held in place by a screw 76 passed through a tongue 77 formed on the separate end 75, the tongue entering between ears 78 and the adjacent portion of the yoke 70.

The belt 42 driven by the motor 36 engages the pulley 40 on the shaft 68, the same as in the structure of Figs. 1, 3 and 4, but instead of directly driving the grinding wheel 41, drives, in Figs. 7 and 8, intermediate gearing. The grinding wheel 41, therefore, instead of being mounted on the pedestal 37 is located nearer to the work support 2 and sufficiently elevated with relation thereto to bring the grinding wheel in proper overhanging position with respect to the blades when the lawn mower itself is carried by the support 2.

In the structure of Figs. 1, 3 and 4, the grinding wheel rotates on an axis parallel with the axis of the rotatable cutter bar while being ground, while in the structure of Figs. 7 and 8, the grinding wheel rotates on an axis substantially at right angles to the cutter bar axis.

In order to guide the cutter bar blades in proper relation to the grinding wheel, there is provided, in the structure shown in Fig. 8, a lug 79 carried by the frame 71 below and closely adjacent to the cutting edge of the grinding wheel and in position to bear against the cutter bar being sharpened. Such cutter bar, indicated at 80 in Figs. 7 and 8, has a longitudinal twist so that as the carriage 18 is moved lengthwise of the grinding machine, the cutter bar as whole is given a slow rotation about its longitudinal axis and is held in proper relation to the grinding wheel while the carriage is moved along the tracks 17.

In the structure shown in Figs. 1, 3 and 4, the action of the grinding wheel is transverse to the length of the blade while in the structure shown in Figs. 7 and 8 the action of the grinding wheel is lengthwise of the blade.

In Fig. 4, there is shown a blade guide 81 arranged to receive the edge of a curved rotary cutter, the guide being mounted on a screw stem 82 carried by a bracket 83 fast to the pedestal 37, the screw stem admitting of adjustment of the guide 81 to cutter blades of different sizes and positions. When the carriage 18 is moved upon the tracks 17, the guide participates in such movement and causes a corresponding rotation of the cutter, the action being similar to that of the lug 79 in Fig. 8.

In Fig. 7, there is shown an eye pin 84 adapted to the sockets 16 and designed to receive the end of the rotary cutter shaft 85 shown in Fig. 7.

To support the stationary cutter bar, which is removed from the lawn mower for grinding, there is provided a cutter bar holder shown separately in Fig. 10 and having a pin extension or stem 86 to enter the socket 16, there being two such holders to carry the opposite ends of the stationary cutter bar. These holders each have a head 87 with oppositely disposed recesses 88 and set screws 89, whereby the grinding wheel shown in Figs. 3 and 4 may be employed for sharpening the stationary cutter bar. The recesses or slots 88 are required for holding a slotted cutter bar, bolts being used at each end engaging the cutter bar and passing through said slots. The screws 89 are used for adjusting the cutter bar, and also serve as a rigid support to prevent the bar from turning, contacting as they do against the back side of the bar.

It is to be noted that the grinding of the blades and the presentation of the blades to the grinding element is automatic, and while an electric motor is indicated as the prime mover, such a motor being particularly adapted for the purpose, other prime movers may be employed. It is also to be noted that while the machine has been described as a lawn mower sharpener, it is capable of sharpening many types of straight edged and curved edge knives, and I do not wish to be limited therefore to any particular kind of work which my machine will do.

What is claimed is:—

1. A device for aiding in the support of lawn mower cutter bars and the like during sharpening, comprising a stem, an enlarged head at one end of said stem, a pair of slots or recesses in said head, and a pair of set screws carried by the head.

2. A lawn mower sharpener comprising supports upon which the lawn mower may be mounted, a carriage movable lengthwise of the lawn mower blades when mounted on the support, opposed straight parallel rack bars secured to a fixed part of the lawn mower sharpener, a prime mover on the carriage, a grinding wheel driven by the prime mover and also mounted on the carriage for acting on the lawn mower blades, a gear wheel on the carriage connected to the prime mover for actuation thereby, and means engaging the gear wheel and movable to mesh it with one or the other of the racks to drive the carriage in one direction or the other along the blades of the lawn mower.

3. A lawn mower sharpener comprising supporting means upon which the lawn mower may be mounted, a carriage movable lengthwise of the lawn mower blades when mounted upon the supporting means, opposed rack bars in spaced relation and secured to a fixed part of the lawn mower sharpener, a prime mover on the carriage, a grinding wheel on the carriage and connected to the prime mover for actuation thereby and adjustable to engage the parts of the lawn mower to be sharpened, gearing connected to the prime mover and including a gear wheel on the carriage movable into engagement with either of the rack bars, a guide bar mounted and shiftable between the rack bars, and means controlled by the guide bar for shifting the gear wheel into engagement with one or the other of the rack bars to drive the carriage in one direction or the other.

4. A lawn mower sharpener provided with a support for lawn mower parts to be sharpened, a carriage movable along the said lawn mower parts, spaced rack bars fast to a fixed part of the sharpener, a carriage movable lengthwise of the rack bars, a prime mover on the carriage, grinding means on the carriage connected to the prime mover, and driving means for the grinding means and for propelling the carriage, both connected to the prime mover.

5. A lawn mower sharpener comprising a support for the parts of the lawn mower to be sharpened, a reciprocable carriage movable along the support, a prime mover on the carriage and movable therewith, grinding means on the carriage connected to the prime mover, tracks for the carriage extending lengthwise of the lawn mower location when mounted on the support, opposed rack bars disposed lengthwise of the tracks, a guide bar extending and shiftable between the rack bars, a carriage mounted on the tracks, a prime mover on the carriage, grinding means for the blades of the lawn mower and also mounted on the carriage and connected to the prime mover, a gear wheel mounted on the carriage and shiftable into mesh with either of the rack bars, said gear wheel engaging the guide bar for movement thereby into mesh with either of the rack bars, and speed reducing gearing connecting the prime mover with the gear wheel.

6. A lawn mower sharpener comprising a support for the parts of the lawn mower to be sharpened, a reciprocable carriage movable along the support, a prime mover on the carriage and movable therewith, grinding means on the carriage connected to the prime mover, tracks for the carriage extending lengthwise of the lawn mower location when mounted on the support, opposed rack bars disposed lengthwise of the tracks, a guide bar extending and shiftable between the rack bars, a carriage mounted on the tracks, a prime mover on the carriage, grinding means for the blades of the lawn mower and also mounted on the carriage and connected to the prime mover, a gear wheel mounted on the carriage and shiftable into mesh with either of the rack bars, said gear wheel engaging the guide bar for movement thereby into mesh with either of the rack bars, and speed reducing gearing connecting the prime mover with the gear wheel, said speed reducing gearing including worms and worm gears.

7. A lawn mower sharpener comprising a support for the parts of the lawn mower to be sharpened, a carriage movable lengthwise of the parts to be sharpened when mounted on the support, a sharpening device mounted on the carriage and participating in reciprocating movements of the latter, a prime mover on the carriage for driving the sharpening device, and a rack and pinion adjustment mounted on the carriage for causing feed of the carriage toward and from the parts of the lawn mower to be sharpened.

8. In a lawn mower sharpener, a support for parts of the lawn mower to be sharpened, a carriage reciprocable along the support, sharpening means movable lengthwise of the parts to be sharpened and mounted on the carriage, a prime mover, connections between one end of the prime mover and the sharpening means, rack and pinion means on the fixed part of the sharpener and on the carriage, and connections between the other end of the prime mover and the rack and pinion means for imparting lengthwise movements of the carriage with respect to the parts to be sharpened.

9. In a lawn mower sharpener comprising a support for the parts of the lawn mower to be sharpened, a carriage movable lengthwise of a lawn mower when mounted on the support, a prime mover on the carriage, sharpening means on the carriage connected to the prime mover for actuation thereby, spaced opposed rack bars underlying the carriage, a channel bar between the rack bars, means for imparting longitudinal movement to the channel bar, means for guiding the channel bar diagonally to cause it to approach one or the other of the rack bars, a gear wheel participating in the sidewise movements of the channel bar to engage one or the other of the rack bars, and connections between the channel bar and gear wheel to cause the latter to mesh with one or the other of the rack bars.

10. A lawn mower sharpener comprising a support for the parts of the lawn mower to be sharpened, a reciprocable carriage movable lengthwise of the lawn mower parts and carrying a prime mover, grinding or sharpening means mounted on the carriage and participating in the movements of the latter, said grinding means including a grinding wheel, a shaft and gearing on the carriage with the shaft carrying the grinding wheel in overhanging relation to the parts of the lawn mower to be sharpened when mounted on the lawn mower support, and the grinding wheel positioned to gravitate toward the parts to be sharpened, and a prime mover on the carriage for actuating the grinding wheel.

11. A lawn mower sharpener comprising a support for the parts of the lawn mower to be sharpened, a reciprocable carriage, a prime mover thereon, means for imparting reciprocable movements to the carriage from the prime mover, sharpening or grinding means for the parts of the lawn mower to be sharpened comprising a shaft mounted on the carriage, a yoke mounted on the shaft to move about a horizontal axis with the yoke provided with an arm radial to the shaft, another shaft mounted in the arm and having its axis of rotation perpendicular to the first-named shaft, gearing connections between the two shafts, a grinding wheel at the end of the second-named shaft remote from the first-named shaft, and connections between the prime mover and first-named shaft.

In testimony that I claim the foregoing as my own, I have hereto affixed my signature.

CHARLES FRANCISCO BROWN.